Dec. 12, 1933.  B. SASSEN  1,938,785

TRANSMISSION MECHANISM

Filed July 14, 1930  3 Sheets-Sheet 1

Inventor

BERNARD SASSEN

By H. K. Parsons

Attorney

Dec. 12, 1933.  B. SASSEN  1,938,785
TRANSMISSION MECHANISM
Filed July 14, 1930   3 Sheets-Sheet 2

Inventor
BERNARD SASSEN
By H. K. Parsons
Attorney

Dec. 12, 1933.　　　　B. SASSEN　　　　1,938,785
TRANSMISSION MECHANISM
Filed July 14, 1930　　　3 Sheets-Sheet 3
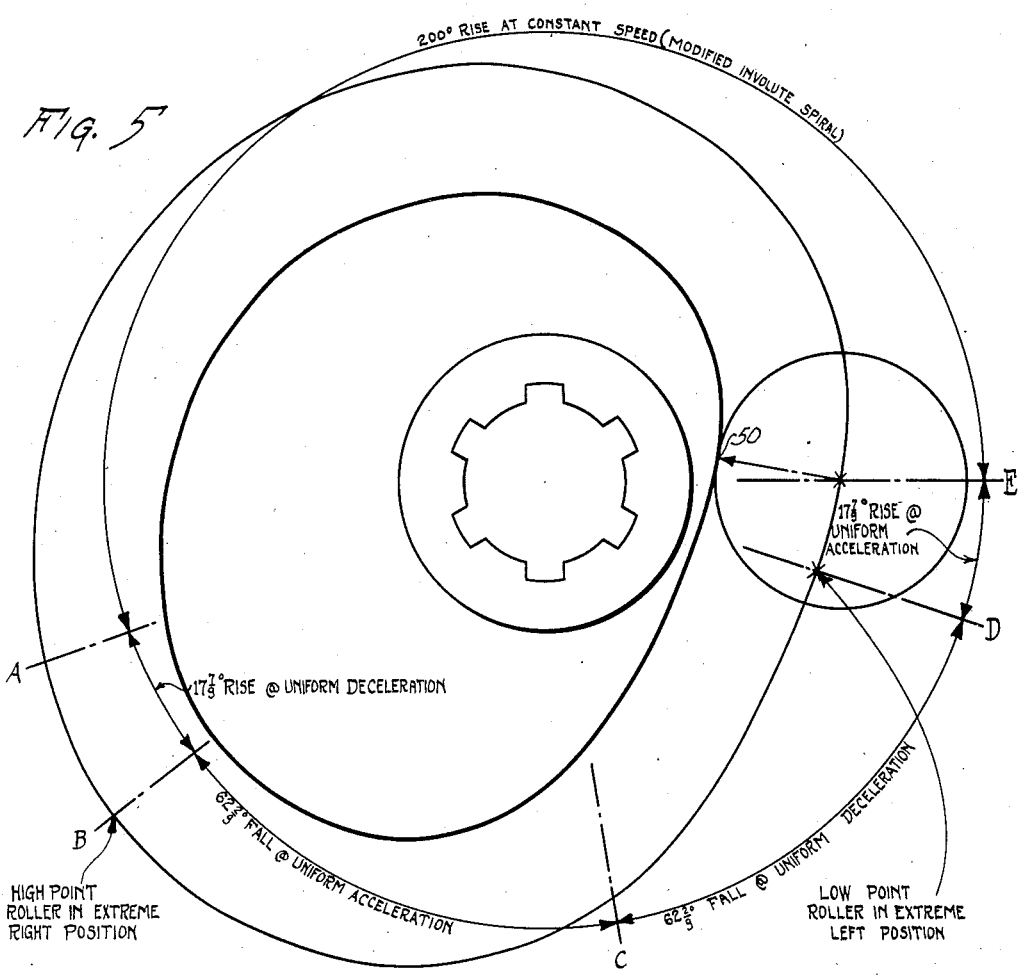
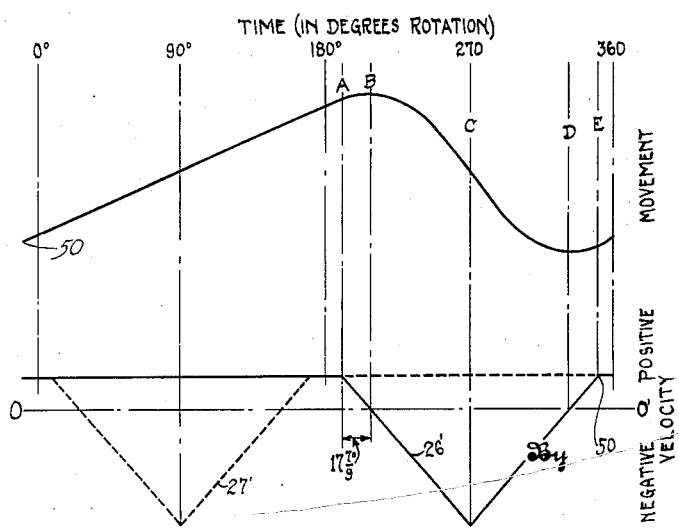
Inventor
BERNARD SASSEN
By H. K. Parsons
Attorney Patented Dec. 12, 1933

1,938,785

UNITED STATES PATENT OFFICE 1,938,785

TRANSMISSION MECHANISM

Bernard Sassen, Cincinnati, Ohio, assignor to The Cincinnati Milling Machine Company, Cincinnati, Ohio, a corporation of Ohio Application July 14, 1930. Serial No. 467,655

2 Claims. (Cl. 74—121)

This invention relates to improvements in transmission mechanism and more particularly to variable speed transmissions of the mechanical type.

One of the principal objects of the present invention is the provision of an improved mechanism for translating rotary motion in the primary into reciprocating motion, and thence back to rotary motion in the secondary, or driven member, in such a way that the resultant rotary motion will be uniform and completely free from intermittent pulsations or vibrations.

A further object of the invention is the provision of an improved form of variable speed transmission mechanism particularly adapted for use in machine tools or other precision machinery to produce a uniform flow of power thereto and prevent chatter or vibration of the driven parts on account of varying or irregular power impulses.

Another object of the present invention is the provision of an improved mechanism of the general nature above set forth which shall be of the variable speed type and will accomplish the foregoing desiderata throughout the entire speed range thereof, and which will be of a nature to facilitate speed variation or adjustment as desired by impositive progressions or increments from zero to the maximum of the transmission range.

Other objects and advantages of the present invention should be readily apparent by reference to the following specification considered in conjunction with the accompanying drawings, and it will be understood that any modifications may be made in the specific structural details hereinafter described, or a combination and arrangement of parts within the scope of the appended claims without departing from or exceeding the spirit of the invention.

Figure 5 is an enlarged semi-diagrammatic view of one of the actuator cams with the several distinct peripheral configurations suitably indicated, and Figure 6 is a comparative chart showing the suitable graphs of the cam configuration and power effect produced thereby.

Figure 4:
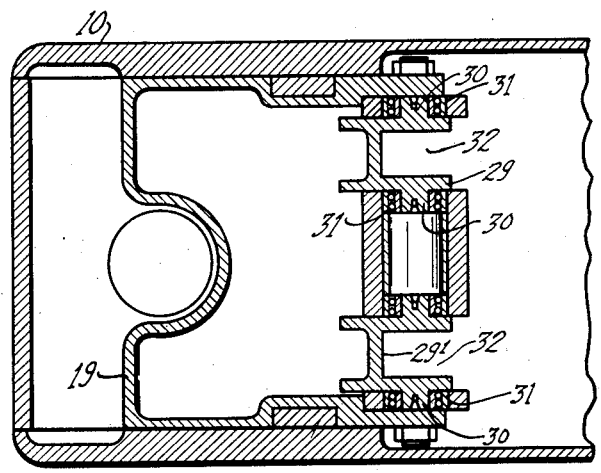
Figure 4 is a fragmentary section through the pivotal mounting for the actuating levers as on line 4—4 of Figure 1.
Figure 2:
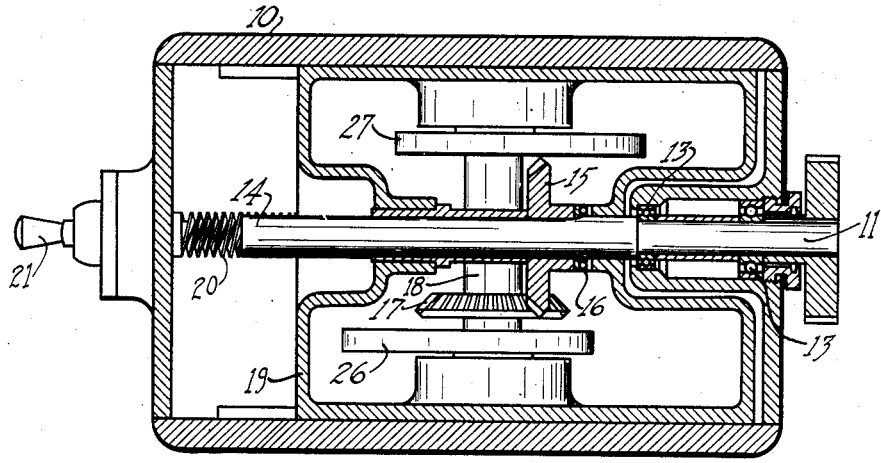
Figure 2 is a section thereof as on the line 2—2 of Figure 1.

In the drawings illustrating one embodiment of the present invention, the numeral 10 designates a suitable transmission box or housing for the present variable speed transmission, having journaled therein a drive shaft 11 driven by a chain 12 from a suitable source of power. This shaft, as indicated in Figure 2, is supported by the antifriction bearings 13 and has a grooved or splined projecting portion 14 inter-engaged with the hypoid gear 15 which circumscribes the shaft and is supported by a thrust bearing 16 in suitable engagement with a mating gear 17 on the cross shaft 18. Shaft 18 is journaled in the shiftable sub-frame 19, which is shiftable back and forth within the housing 10 as by screw 20 projecting from the housing and bearing on its outer end the actuating handle 21. This screw further bears a pinion 22 meshing with gear 23 on the face of the housing, bearing a dial 24 co-operating with a pointer 25 on the housing to denote the selected speed variation in a manner hereinafter described. In the particular form shown, shaft 18 is provided with a pair of actuating cams 26 and 27 similar in form but rotated through an arc of 180 degrees, one with respect to the other. Each of these cams engages an appropriate roller or contact 28 on a pivoted lever 29 I beam form in cross section. These levers, as indicated in Figure 4, have lateral trunnions as at 30, fitting within suitable bearings 31, exteriorly mounted in the sliding framed unit 19. The levers are consequently supported for very free, ready, independent swinging movement or oscillation individually about their respective trunnions, and are provided with channels as at 32 in their forward faces, which extend downwardly past the axis of oscillation thereof.

Figure 1:
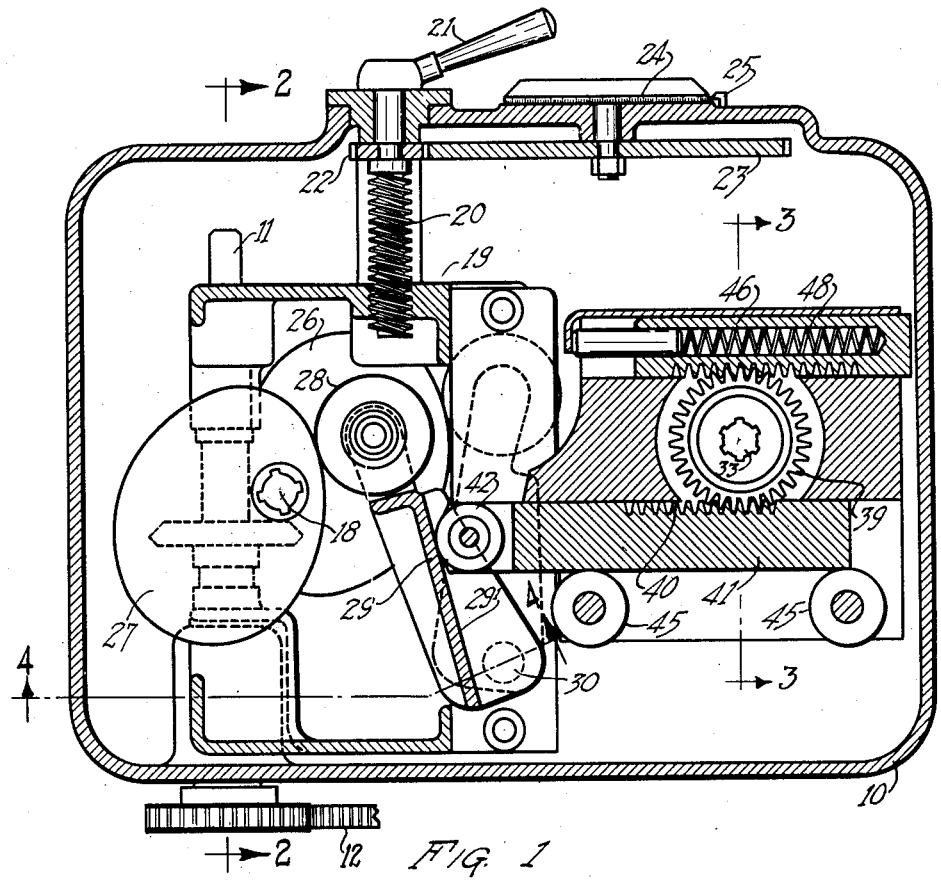
Figure 1 is a transverse section through the transmission embodying the present invention.
Figure 3:
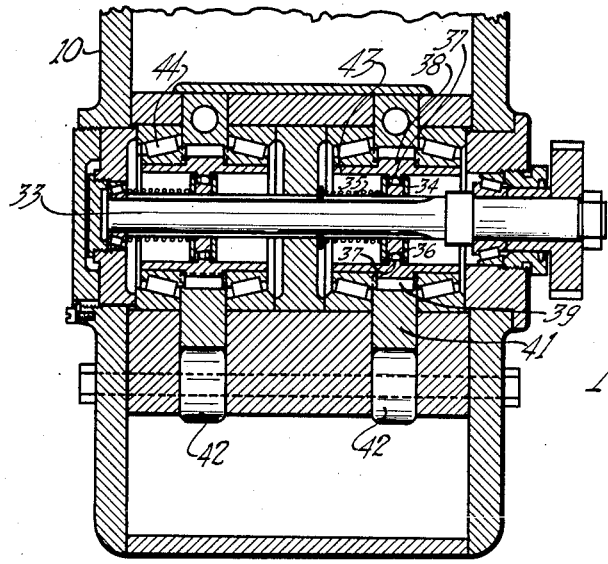
Figure 3 is a section through the ratchet clutch mechanisms and actuators therefor, as on the line 3—3 of Figure 1.

The member to be operated by or receive power through the present mechanism from shaft 11, is a second shaft 33, as particularly indicated in Figures 1 and 3. Mounted on the shaft are a plurality of inner clutch cones 34, urged toward the right, as by springs 35, and bearing on their outer surfaces the diagonally disposed rollers 36 cooperating with the inner cone 37 of the outer silent uni-directional clutch member 38. This member 38 is provided with an outer gear or toothed portion 39 meshing with rack 40 on bar 41, designed to be positively shifted in a right hand direction through engagement of roller 42 on the bar with an individual lever 29. The several outer members have hub portions 43, journaled in the anti-friction bearings 44 to facilitate free rotation of the parts under the impulse imparted thereto by movement of the rack. Suitable supporting mechanism, such as the rollers 45, retain the rack in proper engagement with the individual gear 39. The foregoing mechanism is not more specifically described here as it is of the conventional type commercially known as the Humfrey, Sandberg clutch described in Engineering, issue of May 17, 1929, and is utilized on account of its general efficiency, although other uni-directional pawl and ratchet or other drive mechanism could be utilized.

It will be noted that rotation of shaft 18 will carry around therewith cams 26 and 27, which on account of their relative position on the shaft, as indicated in Figure 1, will successively urge the rollers 28, and thus levers 29, toward the right, and correspondingly move the rack members 41 imparting a counter-clockwise rotation to gear 39. To maintain the rollers 28 in engagement with the cams and reversely actuate levers and their rack bars, use may be made of a second rack 46 for the individual gear 39, and suitable means such as a compression spring 48, designed to urge the upper rack member to the right and thus the lower member to the left.

It is to be understood that as the frame 19 is shifted upwardly, as viewed in Figure 1, the rollers 42 will ride downward in the channels 32 until eventually, due to their diameter and depth of the channel, they will be brought into axial alignment with the trunnions 30. In this position the levers will be without effect so far as imparting movement to the actuating racks 40 are concerned, this therefore being the position of zero adjustment or absence of power transmission. On the other hand, as the frame moves downward toward the position indicated in Figure 1 the amount of throw of the individual racks will be progressively increased and consequently a greater oscillation or partial rotation will be imparted to drive pinion 39 for each cam imparted movement of its corresponding lever 29.

One of the prime essential features in connection with the present invention is the provision of a cam actuator of such type that the effective movement imparted to an individual rack in transmitting power to shaft 33 will be at an absolutely constant rate or velocity for any setting of the relationship between the sliding frame 19, and the racks, while the inter-relationship of the two cams or more, if more than two be desired to be employed, will be effective to insure that power imparted by one rack will overlap the other and pick up the load at the same identical velocity, and maintain this velocity without acceleration or deceleration to the end that the charted power output curve, theoretically as well as empirically obtainable, will be a straight line free from fluctuations or oscillations indicative of pulsation in power application.

That the exact point here in mind may be best appreciated particular reference is made to Figure 6 in which these factors have been charted, for consideration in connection with Figure 5 diagrammatically indicating the exact formation or contour of the effective periphery of the individual cam 26 or 27. By reference to these figures it will be noted that starting at the point 50 on the cam, the surface thereof for substantially 200 degrees is in the form of an involute, such that on rotation an oscillation at a uniform rate will be imparted to the lever 29 and therefore a corresponding constant velocity movement to its associated rack bar 41. At the terminus of the true involute portion of the curve, the same preferably blends into a parabolic portion causing a continued advance of the rack to the right but at a gradually decreasing velocity, until the zero point or limit of movement of the rack to the right is reached. This point is indicated by the intersection of the velocity curve 26' with the line of zero velocity 0—0' on the lower portion of chart Figure 6. From this point the developed contour of the cam is preferably in the form of a pair of blended parabolas, permitting a substantially uniformly accelerated movement in a negative direction to the halfway point of the return stroke, under the reaction of the spring 48 or its equivalent such as by hydraulic return means, followed by a uniformly decelerated motion, to the point where the limit of movement of the rack to the left is reached. From this point the cam causes a uniformly accelerated motion to the right up to the point of constant velocity indicated as about 10 degrees prior to the selected complete operative effect of the individual cam.

It will be understood these exact points may, if desired, be varied within reasonable limits, since the 10 degree leeway to each side of the main 180 degree operative portion of the cam is intended merely to secure an overlap of the driving action of the two racks so that during this overlap the load will be properly taken up by both racks, the constant velocity movement of the one rack, carrying it ahead to take the load away from the previously effective rack as the latter tends to be shifted at a less accelerated rate.

In order to prevent even the slightest deviation from a theoretically non-pulsating flow of power, throughout the range of adjustment of the device, this invention further prescribes that the portions of the cams referred to as involute be slightly modified to compensate for the slightly curvilinear paths of the rollers 28. Owing to the peculiar disposition of the contact surfaces 29' with respect to the centers of oscillation of levers 29 (being in fact tangential to a circle of the same diameter as rollers 42 and with a center coinciding with the center of oscillation of levers 29) proportionality of movement of the racks is insured throughout the entire range.

This effect, both as to attainment of a constant velocity or rate of rotation of shaft 33 for a prescribed adjustment of the parts, should be most clear by reference to the chart Figure 6, in which the upper portion of the chart indicates the development of the effective or operative peripheral surface of the individual cam member 26 or 27 as respects its axis during the several revolutions, while the lower portion indicates the resultant transmitted velocity. Line 26', which is a full heavy line, may be considered as indicating the velocity of one of the clutch members as effected by cam 26, while the dash line 27' may be considered as the corresponding indication of the effect of cam 27 whose phase angle or relationship is 180 degrees with respect to the first cam. By reference to these views it will be noted that the effective velocity as imparted to shaft 33 by the clutches is a constant one the effects of the two racks overlapping, the one the other, to insure proper pick up and maintenance of this velocity without pulsations or vibrations such as are normally noticeable when individual distinct impulses are utilized for transmittal of a power actuating effect.

From the foregoing description considered in conjunction with the accompanying drawings, the general operation and advantages of the present structure should be readily apparent, and it will be noted that there has been provided a structure for attainment of variable speed transmission from shaft 11 to shaft 33 at an infinite number of rates, progressing by varied increments as desired and independent of gear ratios, or the like. To attain these varied ratios, it is merely necessary to vary the relationship between the fulcrum point of the various pivoted levers and the effective engagement of these swinging levers with the corresponding rack bars. It will further be noted that the mechanism involves improved mathematically determined means for imparting oscillation to the several levers of such nature that one lever will always be receiving a constant velocity power impulse in the given direction, while the adjacent lever is returning for subsequent actuation and is actuated successively at a corresponding constant velocity which is attained prior to and in overlapping relation with the movement imparted to the first, whereby a constant non-pulsating uniform flow of power at the desired rate is insured.

It will further be noted that the type of clutch mechanism here utilized is such as to be substantially instantaneous in action and automatic in operation to provide a rapid pick up or grip independent of position of individual teeth, to provide a positive drive once application of power has been made therethrough, and a ready release of the gripping action on discontinuation of the application of power.

It will be further understood that, while for clarity of understanding of the operation of the mechanism, the same has been illustrated as utilizing but two cams and plungers, that any greater multiple number could be effectively employed so long as the relation between the cam surface configurations and their face are such that they will join or overlap, one with the other, to insure constant velocity of movement of the individual power transmitting elements, such as the oscillating levers 29 and therefore application of constant rotative drive to shaft 33.

I claim:

1. In a transmission unit of the class described, the combination of a housing, a driven shaft journaled in the housing, a plurality of rotatable gears mounted on the driven shaft, uni-directionally operative clutch means for automatically coupling individual gears with said shaft, individual rack bars meshing with the gears, an adjustable mechanism for effecting reciprocation of the rack bars including a longitudinally movable carriage, a rotatable member journaled in the carriage, a drive shaft fixedly journaled in the housing and having splined connection with said rotatable member, rack bar actuating cams journaled in the carriage for actuation by said rotatable member, and means for adjusting said carriage transversely of the rack members to vary the rate of movement imparted thereto by the cam members.

2. In a transmission unit of the class described, the combination of a housing, a driven shaft journaled in the housing, a plurality of rotatable gears mounted on the driven shaft, uni-directionally operative clutch means for automatically coupling individual gears with said shafts, individual rack bars meshing with the gears, an adjustable mechanism for reflecting reciprocation of the rack bars including a longitudinally movable carriage, a rotatable member journaled in the carriage, a drive shaft fixedly journaled in the housing and having splined connection with said rotatable member, rack bar actuating cams journaled in the carriage for actuation by said rotatable member, means for adjusting said carriage transversely of the rack members to vary the rate of movement imparted thereto by the cam members, said means including a screw and nut, one of which is journaled in the housing, manual means for rotating the last named part, a rotatable dial journaled on the housing and reduction gearing coupling the rotatable adjusting member with said dial to indicate the rate of movement imparted to the rack bars.

BERNARD SASSEN.